(12) United States Patent
Borella et al.

(10) Patent No.: US 7,031,275 B1
(45) Date of Patent: Apr. 18, 2006

(54) ADDRESS MANAGEMENT FOR MOBILE NODES

(75) Inventors: Michael S. Borella, Naperville, IL (US); Yingchun Xu, Buffalo Grove, IL (US)

(73) Assignee: UTStarcom, Inc., Alameda, CA (US)

( * ) Notice: Subject to any disclaimer, the term of this patent is extended or adjusted under 35 U.S.C. 154(b) by 842 days.

(21) Appl. No.: 09/750,464

(22) Filed: Dec. 28, 2000

(51) Int. Cl.
*H04Q 7/00* (2006.01)
(52) U.S. Cl. ............ 370/328; 455/433; 455/435.1
(58) Field of Classification Search ......... 370/328, 370/338, 352, 389, 395.52, 401, 329
See application file for complete search history.

(56) References Cited

U.S. PATENT DOCUMENTS

| | | | |
|---|---|---|---|
| 5,159,592 A | 10/1992 | Perkins | |
| 5,410,543 A | 4/1995 | Seitz | |
| 5,598,536 A | 1/1997 | Slaughter | |
| 5,708,655 A | 1/1998 | Toth | |
| 5,812,819 A | 9/1998 | Rodwin | |
| 6,009,474 A | 12/1999 | Lu | |
| 6,052,725 A | 4/2000 | McCann | |
| 6,058,431 A * | 5/2000 | Srisuresh et al. | 709/245 |
| 6,061,349 A * | 5/2000 | Coile et al. | 370/389 |
| 6,157,950 A * | 12/2000 | Krishnan | 709/223 |
| 6,353,614 B1 | 3/2002 | Borella et al. | |
| 6,496,893 B1 * | 12/2002 | Arai | 710/302 |
| 6,515,997 B1 * | 2/2003 | Feltner et al. | 370/401 |
| 6,549,538 B1 * | 4/2003 | Beck et al. | 370/395.52 |
| 6,584,096 B1 * | 6/2003 | Allan | 370/352 |
| 6,636,498 B1 * | 10/2003 | Leung | 370/338 |
| 6,691,227 B1 * | 2/2004 | Gopal et al. | 713/162 |
| 6,697,354 B1 * | 2/2004 | Borella et al. | 370/352 |
| 2002/0038339 A1 * | 3/2002 | Xu | 709/203 |
| 2002/0080752 A1 * | 6/2002 | Johansson et al. | 370/338 |

OTHER PUBLICATIONS

Y. Rekhter, et al, "Address Allocation for Private Internets", RFC 1918, Feb. 1996, pp. 1-6.
C. Perkins, "IP Mobility Support", RFC 2002, Oct. 1996, pp. 1-46.

* cited by examiner

*Primary Examiner*—Steven Nguyen
*Assistant Examiner*—Clemence Han
(74) *Attorney, Agent, or Firm*—Patents and Licensing LLC; Daniel W. Juffernbruch

(57) ABSTRACT

A home agent assigns disjoint ranges of port numbers to mobile nodes that share a global IP address. In response to a registration request message from a mobile node, the home agent transmits to the mobile node its assigned range of port numbers, as an extension to a registration reply message. The home agent maintains data records for the mobile nodes that have registered with it, wherein a data record for a mobile node includes its global IP address, its assigned range of port numbers, and its current address. When the home agent receives data packets destined for one of these registered mobile nodes, as determined from the destination address and destination port number specified in the data packets, the home agent forwards the data packets to the current address listed in the mobile node's data record.

20 Claims, 3 Drawing Sheets

ADDRESS MANAGEMENT FOR MOBILE NODES

BACKGROUND OF THE INVENTION

1. Field of the Invention

The present invention relates in general to computer networks. More specifically, the present invention relates to a method and a system for address management of mobile nodes in computer networks.

2. Description of Related Art

The Internet Protocol ("IP") is an addressing protocol designed to route traffic within a network or between networks. In IP, nodes, which may be either hosts or routers, are typically identified by a unique network address, an "IP address." Most widely used versions of IP, such as IP version 4 ("Ipv4"), assume that a node's IP address uniquely identifies the node's point of network attachment. As a result, if a node changes its point of attachment without changing its IP address, it will normally lose its ability to communicate using IP.

With the explosive growth in the use of mobile computers, such as notebook computers and personal digital assistants (PDAs), for accessing the Internet, this limitation is becoming increasing unacceptable. In response, various forms of "mobile IP" have been suggested. Mobile IP typically allows a mobile node to dynamically change its network connectivity in a manner that is transparent to the user.

One such form of mobile IP is described in C. Perkins, "IP Mobility Support," RFC 2002, October 1996, which is incorporated herein by reference. In this form of mobile IP, each mobile node maintains an IP address, its "home address," that is part of its home network's domain, and the mobile node uses its home address whether it is connected to its home network or to a foreign network. However, with the rapid increase in the use of the Internet, the number of available IP addresses using the 32-bit address field provided for by Ipv4 is becoming very limited. With each mobile node assigned its own IP address as well, the problem of limited address space is made even more acute.

Various approaches for dealing with the problem of limited IP address space have been proposed. IP version 6 ("Ipv6") proposes the use of a 128-bit address field for IP addresses. However, a large number of legacy networks and nodes are likely to be limited to 32-bit IP addresses for many years to come.

Network address translation ("NAT") has also been proposed as at least a temporary solution. In the NAT approach, a node uses a private address for communication on its local network, and a NAT device translates this private network is translated to a global IP address for communication with an external network. However, the NAT approach has a number of disadvantages, namely, it tends to be computationally expensive, can cause security problems by preventing the use of certain types of encryption, and can prevent the use of certain applications that do not support NAT.

Accordingly, it is desirable to provide an improved approach for mobile IP that accommodates the limited availability of IP addresses in Ipv4 in a computationally efficient manner.

SUMMARY OF THE INVENTION

In a first principal aspect, the present invention provides a method for address management of mobile nodes. In accordance with the method, a registration request message from a mobile node is received, and at least one globally unique port number is assigned to the mobile node.

In a second principal aspect, the present invention provides a system for address management of mobile nodes, including at least a first mobile node and a second mobile node. The system comprises a home agent and a database accessible by the home agent. The home agent transmits registration reply messages in response to valid registration request messages. The database contains at least a first data record and a second data record. The first data record identifies a first network address and a first set of one or more globally unique port numbers for the first mobile node, and the second data record identifies a second network address and a second set of one or more globally unique port numbers for the second mobile node.

DETAILED DESCRIPTION OF PREFERRED EMBODIMENTS

Figure 1:
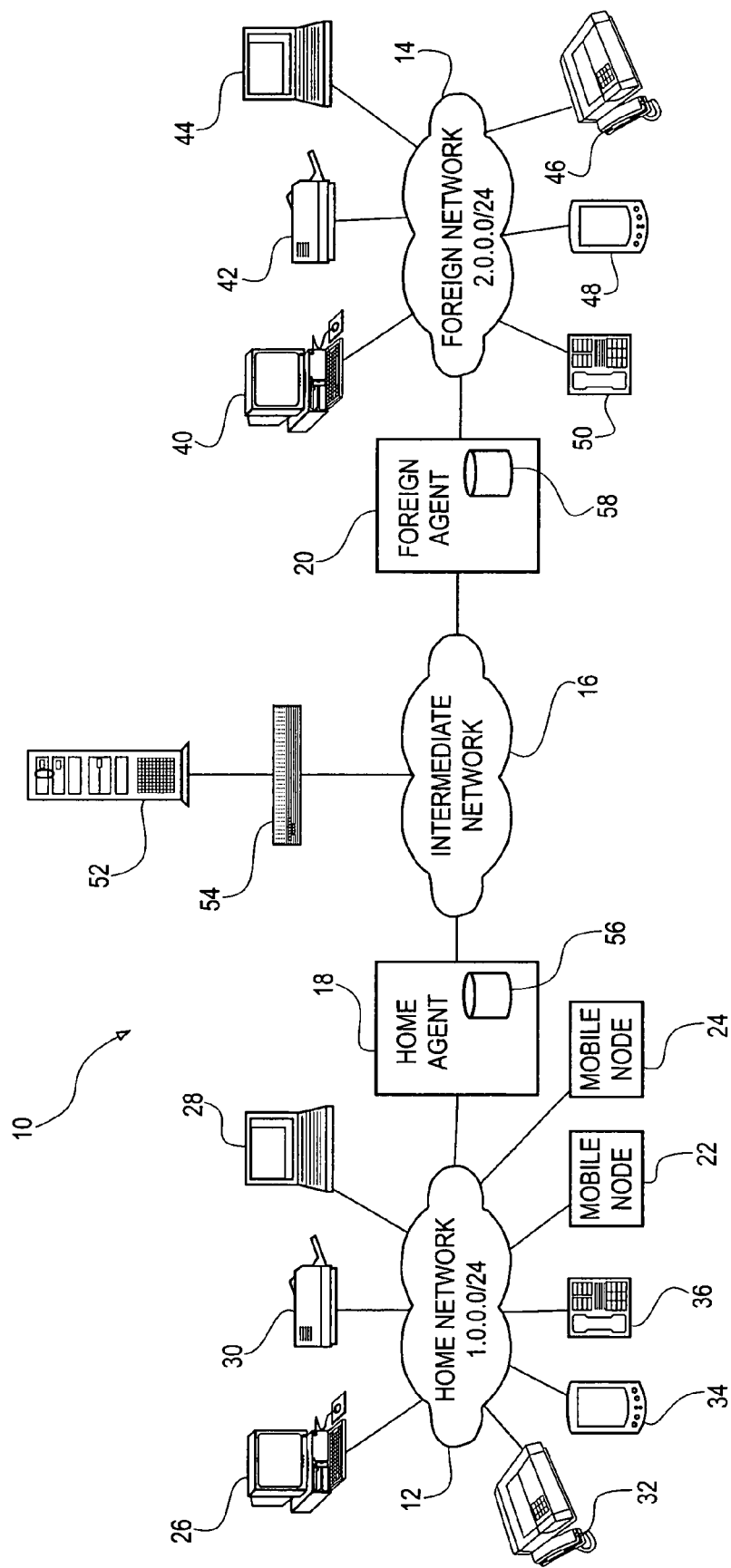
FIG. 1 is a block diagram illustrating an exemplary architecture for a network system, in accordance with a preferred embodiment of the present invention.

A. Exemplary Network Architecture FIG. 1 is a block diagram illustrating an exemplary architecture for network system 10, in accordance with a preferred embodiment of the present invention. Network system 10 includes a home network 12 and a foreign network 14. Home network 12 and foreign network 14 are able to communicate with one another, typically via an intermediate network 16. Intermediate network 16 is typically a wide area network, such as the Internet. Home network 12 is connected to intermediate network 16 via a home agent 18, which is typically the gateway router for home network 12. Similarly, foreign network 14 is connected to intermediate network 16 via a foreign agent 20, which is typically the gateway router for foreign network 14.

Mobile nodes 22 and 24 are connected to home network 12, which is the home network of these mobile nodes, via either wireline communication links or wireless communication links. Each of mobile nodes 22 and 24 is a mobile device that is able to establish network connectivity at a number of different physical locations. Mobile nodes 22 and 24 may, for example, be laptop computers, handheld computers, such as a personal digital assistants (PDAs), wireless telephones, or they may be other types of mobile devices. In some physical locations, mobile nodes 22 and 24 may have communication links with home network 12, as shown in FIG. 1. However, as described in more detail below, mobile nodes 22 and 24 are also able to establish communication links with other networks, such as foreign network 14. The particular network to which mobile nodes 22 and 24 are connected at any given time may depend on the physical location of these mobile nodes, radio frequency (RF) propagation or reception characteristics, network load, or other factors.

As shown in FIG. 1, other network devices are also typically connected to home network 12. Such network devices may include, personal computers, such as desktop computer 26 and laptop computer 28, printers, such as laser printer 30, facsimile devices, such as fax machine 32, handheld devices, such as PDA 34, and telephones, such as digital telephone 36, or other devices that are able to send or receive signals transmitted, at least in part, over a digital network. It is to be understood that the particular configuration of network devices connected to home network 12 shown in FIG. 1 is illustrative only. In general, home network 12 may be connected to a greater or fewer number of network devices, or different types of network devices, than what is shown in FIG. 1. Additionally, although FIG. 1 shows home network 12 connected to two mobile nodes, i.e., mobile nodes 22 and 24, in general, home network 12 may be connected to a greater or fewer number of mobile nodes at any given time.

Foreign network 14 is also typically connected to a number of network devices, such as desktop computer 40, printer 42, laptop computer 44, fax machine 46, PDA 48, and digital telephone 50. It is to be understood that the particular configuration of network devices connected to foreign network 14 shown in FIG. 1 is illustrative only. In general, foreign network 14 maybe connected to a greater or fewer number of, or different types of, network devices.

In addition to home network 12 and foreign network 14, many other networks are typically accessible via intermediate network 16, and such other networks will typically have other network devices connected thereto. FIG. 1 shows a server 52, connected to intermediate network 16 via a router 54, as being representative of such other network devices.

Figure 2:
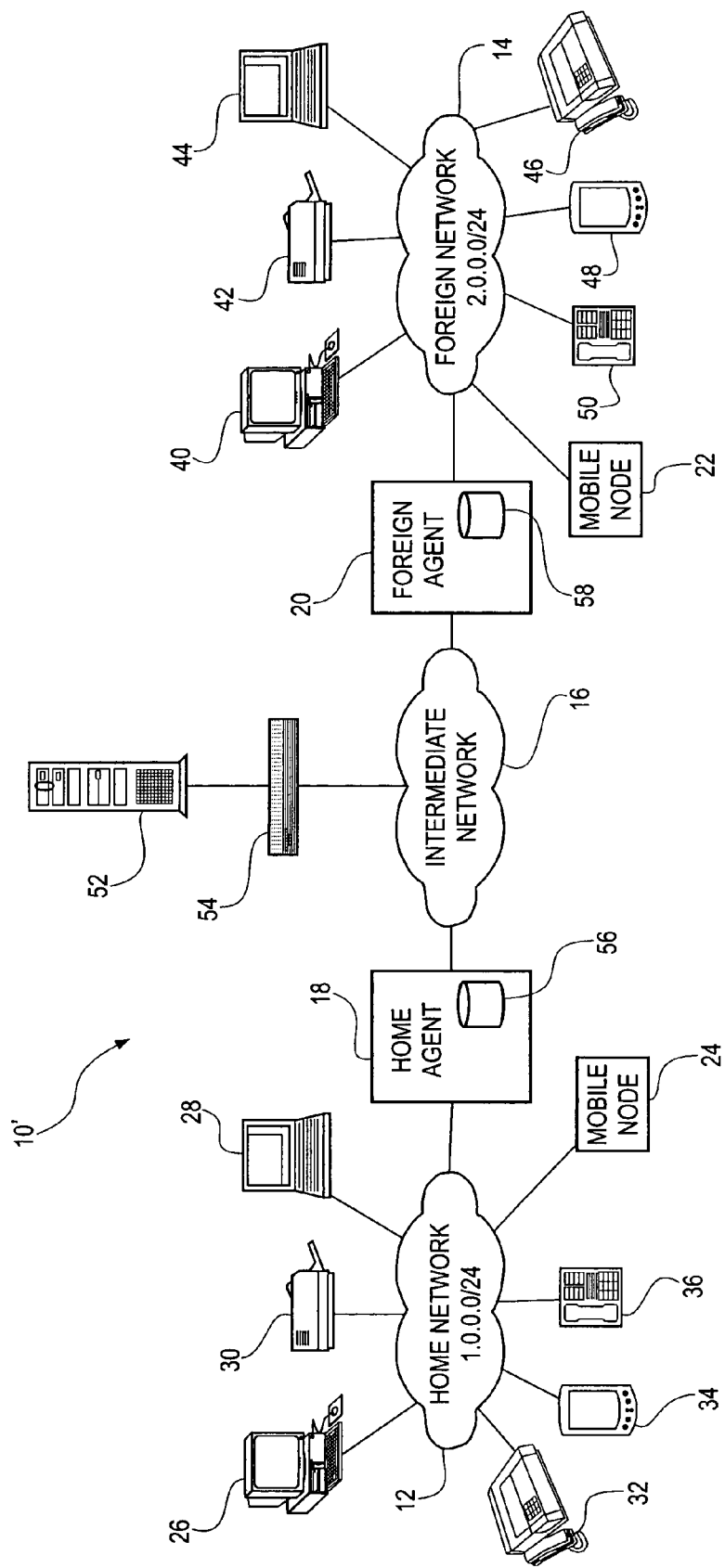
FIG. 2 is a block diagram illustrating an exemplary architecture for the network system of FIG. 1 after a mobile node has changed its network connectivity, in accordance with a preferred embodiment of the present invention.

FIG. 2 is a block diagram illustrating a network system 10' for an illustrative embodiment of the present invention. Network system 10' is similar to network system 10, except that mobile node 22 is connected, via either a wireline communication link or wireless communication link, to foreign network 14. Thus, FIG. 2 shows the case where mobile node 22 has changed its network connectivity from home network 12 to foreign network 14.

B. IP Addresses and Port Numbers

With reference to FIG. 1, home network 12 and foreign network 14 each typically have a range of IP addresses available for use. For example, home network 12 may have IP addresses 1.0.0.0 through 1.0.0.255, and foreign network 14 may have IP addresses 2.0.0.0 through 2.0.0.255, with these IP address ranges conventionally abbreviated as 1.0.0.0/24 and 2.0.0.0/24, respectively. The various devices connected to home network 12 may use IP addresses from this 1.0.0.0/24 range to identify themselves when communicating with devices external to home network 12, such as server 52 and the various network devices connected to foreign network 14. For example, home agent 18 may use 1.0.0.1 as an IP address. However, in the typical case that home agent 18 is a gateway router, home agent will also have one or more external IP addresses, e.g., 3.0.0.1, that correspond to its connections to networks other than home network 12. It is also to be understood, however, that the various network devices connected to home network 12 may use a different, private addressing scheme for communications internal to home network 12.

In the simplest case, each of network devices 22 through 36 has a globally unique IP address. However, when the number of network devices connected to home network 12 exceeds the number of IP addresses available to home network 12, other approaches become necessary. For example, one or more of the network devices connected to home network 12 may share IP addresses. One way of achieving this result is to have the network devices sharing a common IP address distinguished by globally unique port numbers. In this regard, a port allocation protocol, by which such globally unique port numbers may be allocated and used, is described in U.S. patent application Ser. No. 09/035,600, filed Mar. 5, 1998 and assigned to the assignee of the present invention, which application is incorporated herein by reference in its entirety.

As described in more detail below, the present invention provides an approach, in the context of mobile IP, for allocating and using globally unique port numbers to identify one or more mobile nodes, such as mobile nodes 22 and 24, so that these one or more mobile nodes can share a common IP address. As used herein, a "globally unique port number" is a port number that validly identifies only a single node at a particular time, when used with a given IP address or other network address. It is to be understood, however, that more than one node may be identified by the same "globally unique port number" at the same time, provided the nodes have different network addresses. The globally unique port numbers will typically correspond to port numbers used by transport protocols, such as the User Datagram Protocol ("UDP") and the Transmission Control Protocol ("TCP"), and they will typically be 16-bit numbers, as provided for in UDP and TCP. However, whereas UDP and TCP most commonly use port numbers to distinguish among multiple, often simultaneous, connections to a given host having a given IP address, in the present invention, the globally unique port numbers may be used to distinguish different nodes that share a common IP address.

Thus, in the present invention, when more than one mobile node connected to home network 12 has the same IP address, each of these mobile nodes is assigned at lease one globally unique port number that it can use with that IP address. Moreover, each of these mobile nodes is typically assigned a plurality of globally unique port numbers, which may conveniently take the form of disjoint contiguous ranges of port numbers. Thus, as an illustrative example, mobile nodes 22 and 24 may both use 1.0.0.4 as an IP address, but mobile node 22 may be assigned port numbers 2000 through 2999 and mobile node 24 may be assigned port numbers 3000 through 3999.

Home agent 18 maintains a "mobility binding list" that contains data records for currently registered mobile nodes that have home network 12 as a home network. The mobility binding list is preferably stored in a database 56 accessible by home agent 18. In particular, database 56 may be a part of home agent 18, as shown in FIGS. 1 and 2, or database 56 may be in a separate network element.

In the mobility binding list, a data record for a mobile node will typically include: (a) the mobile node's global IP address; (b) a listing of the globally unique port numbers allocated to the mobile node; and (c) a current address that home agent 18 may use to route data packets to the mobile node. A data record for a mobile node may also include other information. The global IP address described above is the IP address that the mobile node uses for external communication, i.e., communication outside of home network 12. This global IP address may be shared with other mobile nodes or with other network devices connected to home network 12. The listing of globally unique port numbers allocated to the mobile node may, in preferred embodiments, identify a range of globally unique port numbers by specifying the lowest and highest port numbers in the range. The current address will typically depend on whether the mobile node is connected to home network 12 or to some other network, such as foreign network 14. When the mobile node is connected to home network 12, the current address will typically be the mobile node's globally unique IP address. When mobile node is connected to networks other than home network 12, such as foreign network 14, the current address will typically be an external IP address that home agent 18 can use as a "care of" address to reach the mobile node, as described in more detail below. The methods by which home agent 18 may obtain this information for the mobility binding list are described herein in subsequent sections.

Foreign agent 20 maintains a "visitor list" that contains data records for all the mobile nodes that are "visiting" foreign network 14, i.e., mobile nodes that do not have foreign network 14 as a home network but that are currently connected to foreign network 14. The visitor list is preferably stored in a database 58 accessible by foreign agent 20. In particular, database 58 may be a part of foreign agent 20, as shown in FIGS. 1 and 2, or database 58 may be in a separate network element.

In the visitor list, a data record for a mobile node will typically include: (a) the mobile node's global IP address; (b) the port number or numbers that the mobile node is using; (c) the IP address of the mobile node's home agent; and (d) the local address of the mobile node. The data record may also include other information. The local address is an address that foreign agent 20 may use to route data packets to the mobile node when it is connected to foreign network 14. For example, in cases where foreign agent 20 uses the point-to-point protocol (PPP) to communicate with mobile nodes, the local address may correspond to a link-layer address or link-layer association of the mobile node. The methods by which foreign agent 20 may obtain the information for the visitor list are described herein in subsequent sections.

C. Data Packet Routing To And From Mobile Nodes

Preferably, a mobile node uses its globally unique port numbers, along with its shared IP address, for external communications, regardless of its point of network connection. Thus, in the above example, mobile node 22 would typically use IP address 1.0.0.4 and port numbers from the 2000–2999 range, whether mobile node 22 is connected to home network 12, as shown in FIG. 1, or to foreign network 14, as shown in FIG. 2. However, data routing to and from mobile 22 will typically be different in the two cases.

In particular, when mobile node 22 is connected to home network 12, as shown in FIG. 1, external communications, such as with server 52, will involve home agent 18 in the following way. The data packets that mobile node 22 sends to server 52 will contain the IP address of server 52 in the destination address field, the shared IP address of mobile node 22 (i.e., 1.0.0.4 in the above example) in the source address field, and one of the globally unique port numbers assigned to mobile node 22 (such as 2000 in the above example) in the UDP, TCP, or other applicable transport protocol's source port field. Home agent 18, intermediate network 16, and router 54 each, in turn, route the data packets based on the destination address, so that they reach server 52.

Server 52, in turn, sends to mobile node 22 data packets that contain the IP address of server 52 in the source address field, the shared IP address of mobile node 22 (i.e., 1.0.0.4 in the above example) in the destination address field, and the globally unique port number that mobile node 22 used to communicate with server 52 (i.e., 2000 in the above example) in the UDP, TCP, or other applicable transport protocol's destination port field. Router 54 and intermediate network 16 route these data packets to home agent 18 based on destination address. Home agent 18, in turn, routes the data packets to mobile 22 based on the destination port, typically by referring to the records described above.

When mobile node 22 is connected to foreign network 14, it will, in preferred embodiments, continue to identify itself by using its shared IP address (i.e., 1.0.0.4 in the above example) and port numbers from its set of one or more globally unique port numbers (i.e., port number 2000–2999 in the above example). Thus, when mobile node 22 sends data packets to server 52, these data packets will contain the IP address of server 52 in the destination address field, the shared IP address of mobile node 22 (i.e., 1.0.0.4 in the above example) in the source address field, and one of the globally unique port numbers assigned to mobile node 22 (such as 2000 in the above example) in the UDP, TCP, or other applicable transport protocol's source port field. Foreign agent 20, intermediate network 16, and router 54 each, in turn, route the data packets based on the destination address, so that they reach server 52.

However, the routing of the data packets that server 52 sends to mobile node 22 is typically more complicated. These data packets contain the IP address of server 52 in the source address field, the shared IP address of mobile node 22 (i.e., 1.0.0.4 in the above example) in the destination address field, and the globally unique port number that mobile node 22 used to communicate with server 52 (i.e., 2000 in the above example) in the UDP, TCP, or other applicable transport protocol's destination port field. Router 54 and intermediate network 16 each, in turn, route these data packets based on destination address. Because home agent 18 is advertising a route to IP addresses in the 1.0.0.0/24 range, the data packets are routed to home agent 18, even though mobile node 22 is actually connected to foreign network 14. To send the data packets to mobile node 22, home agent 18 uses the current address for mobile node 22 in its mobility binding list, i.e., the current address associated with the IP address and port number found in the destination address and destination port number fields in the data packets its data. As described in more detail below, the current address will typically be an IP address corresponding to foreign agent 20.

In that case, home agent 18 then forwards the data packets to foreign agent 20. Preferably, home agent 18 accomplishes this forwarding by using a "tunneling" or "encapsulation" procedure. Examples of suitable tunneling/encapsulation methods are those described in the following references: (1) S. Hanks, et al., "Generic Routing Encapsulation (GRE)," RFC 1701, October 1994; (2) C. Perkins, "IP Encapsulation Within IP," RFC 2003, October 1996; and (3) C. Perkins, "Minimal Encapsulation Within IP," RFC 2004, October 1996, and each of these references is fully incorporated herein by reference. Briefly stated, in such tunneling/encapsulation processes, home agent 18 encapsulates the original data packets sent by server 52 into tunneling data packets that list the IP address of foreign agent 20 as the destination address. Intermediate network 16 then routes the tunneling data packets to foreign agent 20 based on this destination address. Foreign agent 20 receives the tunneling data packets and extracts therefrom the original data packets, which contain the shared IP address of mobile node 22 (i.e., 1.0.0.4 in this example) in the destination address field, and the globally unique port number that mobile node 22 used to communicate with server 52 (i.e., 2000 in this above example) in the UDP, TCP, or other applicable transport protocol's destination port field. Foreign agent 20 then routes the data packets to mobile node 22, typically by routing the local address for mobile node 22 obtained from the visitor list data record for mobile node 22.

In other cases, the care-of address of mobile node 22 may not correspond to foreign agent 20. For example, the care-of address may be associated with a network interface of mobile node 22. In such cases, home agent 18 will typically forward data packets to this care-of address in order to reach mobile node 22. However, home agent 18 may not need to use a tunneling/encapsulation procedure to do so.

D. Registration

In mobile IP, a mobile node typically uses a registration process to become qualified to use a given network for communication. Thus, when mobile node 22 attempts to establish a communication link with home network 12, as shown in FIG. 1, it undergoes a registration process to become qualified to use home network 12. Similarly, when mobile node 22 changes its connectivity from home network 12 to foreign network 14, as shown in FIG. 2, it undergoes another registration process to become qualified to use foreign network 14. Further, when mobile node 22 returns to home network 12, it will again go through a registration process to become qualified to use home network 12. As described in more detail below, the registering process for mobile node 22 will typically involve home agent 18 and, in the case of registering with foreign network 12, will also typically involve foreign agent 20. As described in more detail below, it is through this registration processes that home agent 18 may obtain at least some of the information for its mobility binding list and foreign agent 20 may obtain at least some of the information in its visitor list.

The registration process preferably includes at least a registration request step and a registration reply step. When mobile node 22 attempts to register with home network 12, it typically sends at least one registration request message to home agent 18. A registration request message will contain an IP address of home agent 18, e.g., 1.0.0.1, in the destination address field, and the payload will typically include various codes and/or other data to indicate to home agent 18 that mobile node 22 is attempting to register. If mobile node 22 already has a global IP address allocated to it, then the payload will typically include this IP address in a "home address" field. If mobile node 22 does not yet have an IP address allocated to it, then it may identify itself in the registration request message in other ways. A preferred format for a registration request message is described in RFC 2002. However, other formats could be used.

Mobile node 22 may obtain the IP address of home agent 18 in a number of different ways. For example, the IP address may be programmed into mobile node 22. Alternatively, mobile node 22 may obtain the IP address from agent advertisement messages sent by home agent 18, such as the agent advertisement messages described in RFC 2002. Mobile node 22 may also obtain the IP address in response to agent solicitation messages, such as the agent solicitation messages described in RFC 2002, sent by mobile node 22. Mobile node 22 may also obtain the IP address of home agent 18 by querying a domain name server (DNS).

When home agent 18 receives a valid registration request message from mobile node 22, it allocates at least one globally unique port number for mobile node 22. If mobile node 22 does not yet have an global IP address, then home agent also allocates a global IP address for mobile node 22. Home agent 18 then sends mobile node 22 at least one registration reply message. The at least one registration reply message includes the globally unique port number(s) allocated for mobile node 22, the global IP address of mobile node 22, and one or more codes or other data to indicate to mobile node 22 that its registration request was accepted. A preferred format for a registration reply message is described in RFC 2002, though other formats could be used. If the registration reply message complies with the RFC 2002 format, then the globally unique port numbers are preferably identified in a port range extension 100 to the registration reply message, as shown in FIG. 3.

Figure 3:
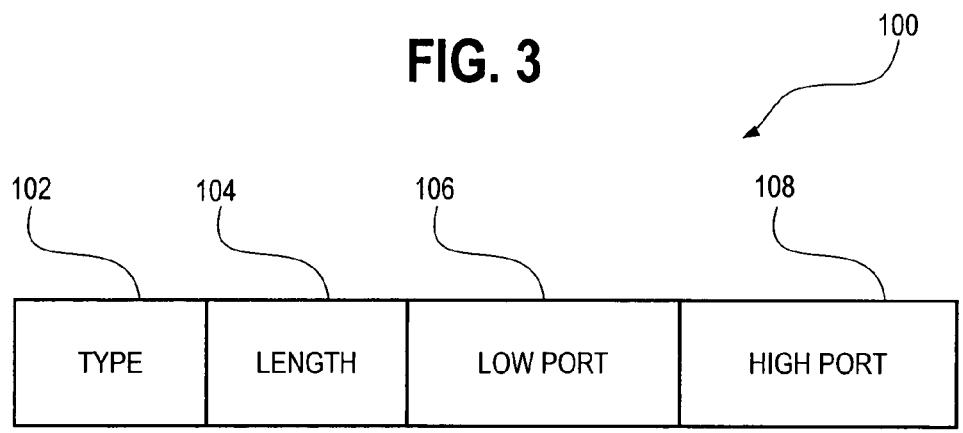
FIG. 3 illustrates a port range extension to a registration reply message, in accordance with a preferred embodiment of the present invention.

With reference to FIG. 3, port range extension 100 includes a type field 102, a length field 104, a low port field 106, and a high port field 108. Low port field 106 is preferably a 2-byte number that specifies the lowest globally unique port number in a range of contiguous port numbers allocated for mobile node 22. High port field 108 is preferably a 2-byte number that specifies the highest globally unique port number in the range. Type field 104 is preferably a one-byte predetermined number that identifies what type of mobile IP extension port range extension 100 is. Length field is preferably a one-byte number that corresponds to the combined length, in bytes, of port fields 106 and 108. Preferably, port range extension 100 complies with the mobile IP extension format specified in RFC 2002.

In addition to sending the at least one registration reply message described above, home agent 18 also updates its mobility binding list to provide a data record for mobile node 22. In particular, for the data record for mobile node 22, home agent specifies the global IP address and globally unique port numbers allocated for mobile node 22. To specify the current address in the data record for mobile node 22, home agent 18 will typically use the address from which the registration request message was sent.

When mobile node 22 attempts to register with foreign network 14, it typically sends at least one registration request message to foreign agent 20. Such a registration request message will contain an IP address of foreign agent 20, e.g., 2.0.0.1, in the destination address field and one of the globally unique port numbers of mobile node 22 in the source port field, if mobile node 22 has been allocated a globally unique port number by home agent 18. The payload of the registration request message will typically include an external IP address for home agent 18, e.g., 3.0.0.1, a care-of address for mobile node 22, and various codes and/or other data to indicate to foreign agent 20 that mobile node 22 is attempting to register. In addition, if mobile node 22 has been allocated an IP address by home agent 18, then the payload will typically include this in a "home address" field. The registration request message may include other information to identify mobile node 22. RFC 2002 describes a preferred format for a registration request, though other formats could be used.

The care-of address is an address to which home agent 18 can send data packets, using the tunneling/encapsulation procedure described above, so that they will be able to reach mobile node 22 when it is connected to foreign network 14. Typically, the care-of address is an external IP address associated with foreign agent 20, e.g., 4.0.0.1, that mobile node 22 has obtained from agent advertisement messages sent by foreign agent 20, such as the agent advertisement messages described in RFC 2002. Alternatively, mobile node 22 may obtain the care-of address by other means. Moreover, the care-of address need not be associated with foreign agent 20. For example, the care-of address may be associated with a network interface of mobile node 22.

Typically, mobile node 22 also obtains the IP address of foreign agent 20 from its agent advertisement messages.

Alternatively, mobile node 22 may obtain the IP address of foreign agent 20 in response to agent solicitation messages from mobile node 22.

When foreign agent 20 receives a valid registration request message from mobile node 22, it forwards it to home agent 18, using the IP address for home agent 18 contained in the registration request message. Foreign agent 20 may also updates its visitor list to provide a data record for mobile node 22. More particularly, foreign agent 20 may use the mobile node's IP address (if provided), port number (if provided), and home agent IP address from the registration request message to fill in these fields in the data record for mobile node 22. For the local address field in the data record, foreign agent 20 may use the address from the registration request message was sent.

When home agent 18 receives the registration request message forwarded by foreign agent 20, home agent 18 first typically determines whether it is valid. If it is valid, home agent 18 then locates the data record for mobile node 22 in its mobility binding list. If the registration request message contains the IP address and globally unique port number used by mobile node 22, then home agent 18 typically locates the data record for mobile node 22 based on this information. Otherwise, home agent 18 may locate the data record for mobile node 22 based on other identifying information contained in the registration request message.

Once home agent 18 obtains the data record for mobile node 22, it updates the current address field with the care-of address contained in the registration request message. Home agent 18 may also allocate an IP address and/or one or more globally unique port numbers for mobile node 22, particularly if the registration request message did not include this information. In such cases, home agent 18 will also typically update the mobility binding list data record for mobile node 22 with the newly-allocated IP address and/or port numbers.

Home agent 18 then sends foreign agent 20 at least one registration reply message. The at least one registration reply message typically includes the globally unique port number(s) allocated for mobile node 22, the global IP address of mobile node 22, and one or more codes or other data to indicate that the registration request message was accepted. RFC 2002 describes a preferred format for the registration reply message, though other formats could be used. In addition, the globally unique port numbers are preferably identified in port range extension 100 to the registration reply message, as shown in FIG. 3 and described above.

When foreign agent 20 receives the at least one registration reply message, foreign agent 20 forwards it to mobile node 22. Foreign agent 20 may also update its visitor list data record for mobile node 22 with information contained in the at least one registration reply message, particularly if the IP address and port numbers for mobile node 22 were newly-allocated by home agent 18 in response to the registration request message.

E. Conclusion

By allowing mobile nodes to share IP addresses and be distinguishable based on port number, the preferred embodiments of the present invention may extend the useful life of IPv4. Moreover, subnets may be able to accommodate mobile nodes that use mobile IP, without having to purchase additional IP addresses. The preferred embodiments of the present invention are also computationally efficient, in that network address translation is not required.

It is to be understood that the present invention relates primarily to the network layer, i.e., to layer 3 in the Open Systems Interconnection (OSI) model. Accordingly, higher-level protocols and applications, which may require additional signaling, call flows, and network elements, may be used with the present invention. As but one of many possible examples, the mobile nodes may engage in IP telephony, in accordance with the H.323 standard, Session Initiation Protocol (SIP), or other protocol. In such cases, other network elements, such as gateways or proxy servers will typically be involved. For example, further information regarding SIP proxy servers is provided in the U.S. patent application Ser. No. 09/707,708, entitled "Distributed Network Address Translation for a Network Telephony System," filed on Nov. 7, 2000 and assigned to the assignee of the present invention, which application is fully incorporated herein by reference.

An exemplary embodiment of the present invention has been illustrated and described. It will be understood, however, that changes and modifications may be made to the invention without deviating from the spirit and scope of the invention, as defined by the following claims.

The invention claimed is:

1. A method for address management of mobile nodes, said method comprising the steps of:
   receiving a mobile IP message comprising a registration request message from a first mobile node;
   assigning a first port range of globally unique port numbers to said first mobile node; and
   transmitting said first port range of globally unique port numbers to said first mobile node.

2. The method of claim 1, further comprising the steps of:
   assigning a network address to said first mobile node; and
   transmitting said network address to said first mobile node.

3. The method of claim 2, wherein said network address is an Internet Protocol (IP) address.

4. The method of claim 2, wherein said network address can be shared with a second mobile node.

5. The method of claim 4, further comprising the step of:
   assigning a second port range of globally unique port numbers to said second mobile node, wherein said first and second port ranges are disjoint.

6. The method of claim 1, wherein said registration request message includes a care-of address for said first mobile node.

7. The method of claim 6, further comprising the step of:
   associating said care-of address with said first port range of globally unique port numbers.

8. The method of claim 6, further comprising the steps of:
   assigning a network address to said first mobile node; and
   associating said care-of address with said network address and said first port range of globally unique port numbers.

9. The method of claim 8, further comprising the steps of:
   receiving data packets destined for said network address and a port number in said first port range of globally unique port numbers; and
   forwarding said data packets to said care-of address.

10. The method of claim 1, wherein said first port range of globally unique port numbers is defined by a low port number and a high port number.

11. A method for address management of mobile nodes, said method comprising the steps of:
   receiving a registration request message from a first mobile node;
   assigning a first range of globally unique port numbers to said first mobile node, wherein said first range of globally unique port numbers is defined by a low port number and a high port number; and transmitting a registration reply message to said first mobile node, said registration reply message including a port range extension, said port range extension including said low port number and said high port number.

12. A system for address management of mobile nodes, said mobile nodes including at least a first mobile and a second mobile node, said system comprising:
a home agent, said home agent transmitting mobile IP messages comprising registration reply messages in response to valid registration request messages; and
a home agent database accessible by said home agent, said home agent database containing at least a first data record and a second data record, said first data record identifying a network address and a first port range of globally unique port numbers for said first mobile node, said second data record identifying said network address and a second port range of globally unique port numbers for said second mobile node, wherein said first and second port ranges are disjoint.

13. The system of claim 12, wherein said first data record includes a care-of address for said first mobile node, said care-of address being different from said network address.

14. The system of claim 13, further comprising:
a foreign agent, coupled to said home agent via an intermediate network; and
a foreign agent database accessible by said foreign agent, said foreign agent database containing a visitor data record for said first mobile node, said visitor data record including said network address and said first port range of globally unique port numbers for said first mobile node.

15. The system of claim 14, wherein said visitor data record includes a local address of said first mobile station.

16. The system of claim 14, wherein said care-of address is an Internet Protocol (IP) address.

17. The system of claim 16, wherein said care-of address is an external IP address associated with said foreign agent.

18. The system of claim 14, wherein said visitor data record includes an IP address of said home agent.

19. The system of claim 12, wherein said network address is an Internet Protocol (IP) address.

20. The system of claim 12,
wherein said first range of globally unique port numbers is defined by a low port number and a high port number; and
wherein said second port range of globally unique port numbers is defined by a low port number and a high port number.

* * * * *